Figure 1:
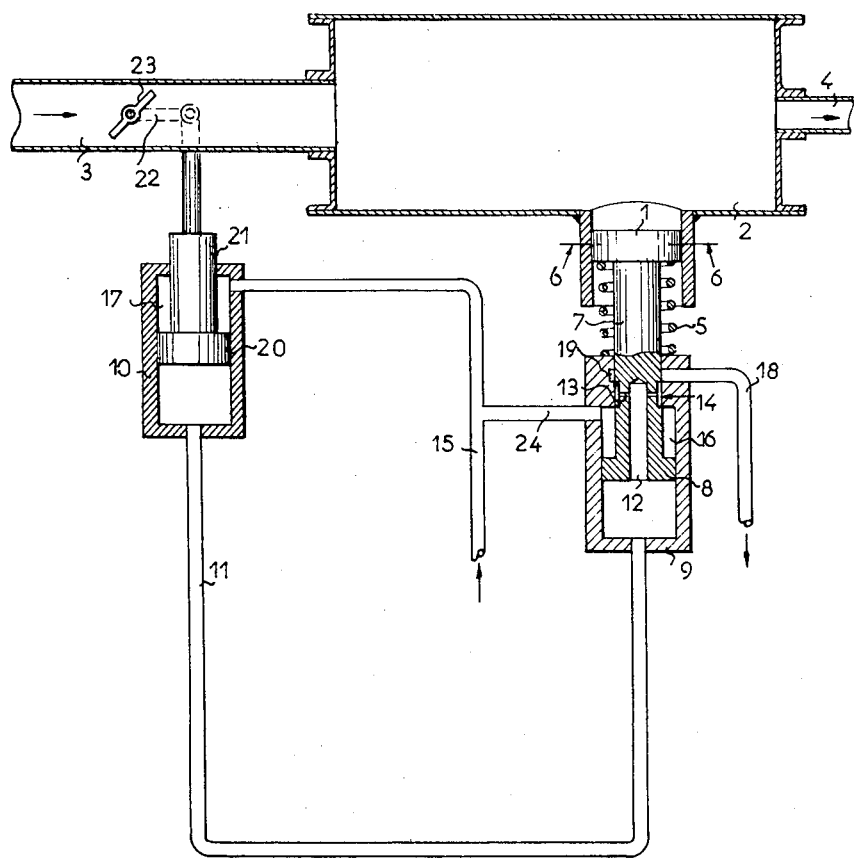

Oct. 30, 1962

P. AUDEMAR 3,060,951

HYDRAULIC REGULATING SYSTEM

Filed Dec. 18, 1957

2 Sheets-Sheet 1

INVENTOR:

Pierre Audemar

BY

Richards & Geier

ATTORNEYS

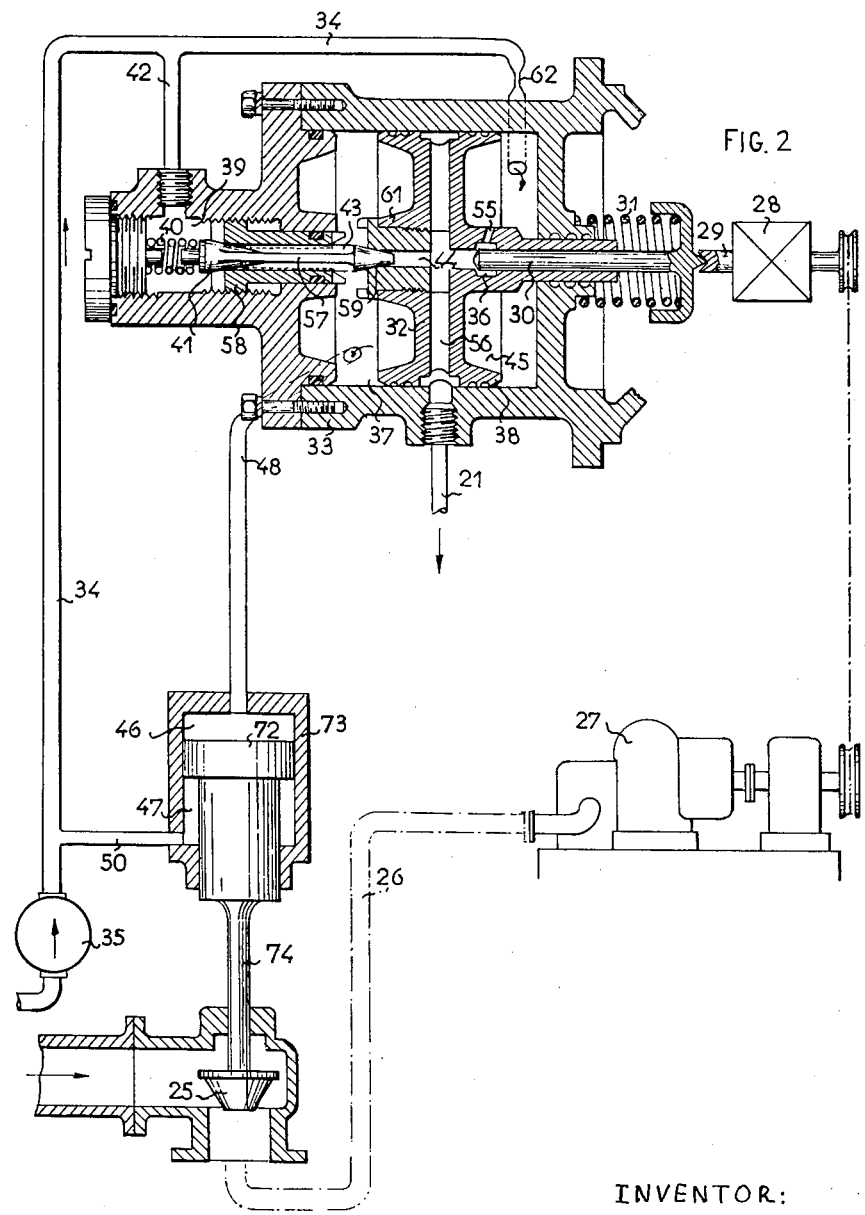

United States Patent Office 3,060,951
Patented Oct. 30, 1962

3,060,951
HYDRAULIC REGULATING SYSTEM
Pierre Audemar, Mulhouse, Haut-Rhin, France, assignor to Societe Alsacienne de Constructions Mecaniques, Haut-Rhin, France, a French company
Filed Dec. 18, 1957, Ser. No. 703,617
Claims priority, application France Dec. 26, 1956
13 Claims. (Cl. 137—58)

This invention relates to a governor and refers more particularly to a governor or to a regulating device, the purpose of which is to maintain at a constant value a variable quantity, such as, for example, the pressure which prevails in an apparatus constituting a circuit through which a compressed gas is allowed to flow, or the speed of an internal combustion engine, etc.; the governor or the regulating device has the task of maintaining such variable quantity constant irrespective of other factors which affect this variable quantity, such as the load of the motor, the requirements of the apparatus utilizing compressed gas, etc.

Prior art regulators of this type require the use of complicated aggregates combined with dash-pot systems, spring systems, etc., and interposed between an actuating device movable in opposite directions from a set position in response to changes in the variable quantity, the set position corresponding to the desired value of the variable quantity, and the actual controlling device which actuates the apparatus so as to affect the variable quantity and bring it back to the required predetermined value.

An object of the present invention is to improve devices of this type.

Another object is the provision of an apparatus which attains the same results as prior art devices but by extremely simple and inexpensive means.

Yet another object is the provision of an apparatus of the type described which in operation attains a complete security of functioning, in that it does not require any adjustment and does not offer any play.

Other objects of the present invention will become apparent in the course of the following specification.

The objects of the present invention may be realized through the provision of a regulator of the described type, which includes a link consisting of a column of liquid of variable length which is continuously maintained compressed by elastic means, said link being interposed between the actuated device and the controlling device. The apparatus, according to the invention, is operated in such manner that all movements of the actuated device from the predetermined set position cause an actuation of the controlling device in the direction which tends to bring back the variable quantity to its initial predetermined value, said actuation being produced by the direct power connection betweenn the actuated device and the controlling device which is assured by the aforesaid liquid link; at the same time, this movement of the actuated device from the set position produces a change in the operative length of the liquid link which amplifies the action exerted upon the controlling device and which continues this action so long as the deviation from the predetermined position exists.

According to another characteristic feature of the invention, the speed with which the length of the liquid link is varied is a function of the deviation of the actuated device and increases therewith. In other words, the compensating action exerted upon variable quantity which is being controlled, is faster when the deviation of the actuated device is greater.

According to a preferred embodiment of the inventive idea, the liquid link is located between two pistons which are connected, respectively, to the actuated device and to the controlling device; the first piston serves at the same time as a valve which admits liquid under pressure into the liquid column so as to extend the latter when the actuated device moves in one direction in relation to its predetermined set position, or, on the contrary, to provide a communication between the liquid link and a tank for the liquid when the actuated device moves in the opposite direction from the predetermined set position, whereby the operative length of the liquid column is diminished, the apparatus being provided with elastic means continuously pressing the two pistons one toward the other so as to maintain the liquid column constituting the link continuously in a compressed state.

According to a particular embodiment of the apparatus, the two pistons in question are differential pistons and the liqiud column constituting the link extends between their front surfaces, while their annular side surfaces are continuously subjected to pressure of the source of liquid.

The invention will appear more clearly from the following detailed description when taken in connection with the accompanying drawings showing, by way of example, two preferred embodiments of the inventive idea.

In the drawings:

FIGURE 1 shows diagrammatically in section a simple pressure regulator constructed in accordance with the present invention, and FIGURE 2 illustrates in section and partly in side view a practical construction of a speed regulator according to the invention, which includes power amplifying means.

The simplified embodiment of the invention shown in FIGURE 1 includes a piston 1, the front surface of which is continuously subjected to pressure prevailing in a container 2 which receives compressed gas from a pipe 3, and which transmits it through a conduit 4 to suitable devices which are not shown in the drawing, and which utilize the compressed gas. Gas pressure exerted upon the piston 1 is balanced by a spring 5, which encloses the piston rod 7 and which engages the piston 1 and a cylinder 9. The pressure of the gas and the pressure of the spring 5 upon the piston 1 are balanced in such manner that when gas pressure upon the piston 1 has a predetermined set value which it is desired to maintain, the piston 1 will occupy a predetermined position indicated in FIGURE 1 by reference marks 6—6. The piston rod 7 of the piston 1 is firmly connected or integral with a differential piston 8 which moves within the cylinder 9. A pipe 11 connects the cylinder 9 with a cylinder 10. The piston 8 is provided with an axial bore 12 which communicates by means of radial ports 13 with the periphery of the piston rod 7 slidable in the portion 14 of the cylinder 9, which has a reduced diameter in relation to the lower portion of the cylinder. A conduit 15 has a lower portion which is in communication with a source of compressed liquid not shown in the drawing. The conduit 15 supplies liquid under pressure to the chamber 17 within the cylinder 10. A branch conduit 24 is connected with the conduit 15 and supplies liquid under pressure to the chamber 16 within the cylinder 9. Another conduit 18 is in communication with an annular chamber 19 formed in the cylinder 9 and extending around the piston rod 7.

In the predetermined set position which is shown in FIGURE 1, the radial passages 13 are situated exactly at the edges of the openings of the conduits 18 and 24.

It is apparent that the liquid located in the cylindrical spaces of the cylinders 9 and 10, the conduit 11, the bore 12 and the radial passages 13 constitutes a liquid column or a liquid link which is maintained in the compressed state by the pressures prevailing in the annular chambers 16 and 17. Since these pressures are equal to each other, and since the surfaces of these annular faces are also equal, the entire system is continuously maintained in a state of equilibrium.

The piston 20 of the cylinder 10 is connected by its piston rod 21 and a linkage 22 to a controlling device which, in the embodiment illustrated, consists of a damper 23 located in the conduit 3 which supplies gas to the container 2.

The device operates in the following extremely simple manner:

Let it be assumed, by way of example, that the pressure prevailing in the container 2 increases, whatever be the reason for such increase. Then the piston 1 will have the tendency to be pushed downwardly (looking in the direction of FIGURE 1) against the action of the spring 5. This downward movement is transmitted directly by the liquid link located in the conduit 11 from the piston 8 rigidly connected with the piston 1, to the piston 20, which will actuate through the piston rod 21 the linkage 22. The damper 23 will be moved in such direction that the amount of gas flowing through the pipe 3 to the container 2, will be decreased, thus tending to reduce pressure in the said container. At the same time, since the piston 8 moves together with the piston 1, the radial passages 13 will also move downwardly and will establish a communication between the conduit 24 and the bore 12 located within the piston 8, as well as the lower portion of the cylinder 9 which is in communication with the conduit 11. Thus a supply of liquid under pressure will be pumped through the conduits 15 and 24, the passages 13 and the bore 12 into the conduit 11 so that the operative length of the liquid column will be extended. This increase in the operative length of the liquid column or the liquid link will exert an additional pressure upon the piston 20 in the same direction in which pressure is transmitted to the piston 20 by the piston 8. It will be noted that this increase in length of the liquid link continues so long as the piston 8 is located out of and below its predetermined set position designated by the marks 6—6. It wil be also noted that the speed with which the operative length of the liquid column or liquid link increases is proportional to the operative sectional area of the passages 13, and, consequently, is proportional to the variation of the variable quantity which is being controlled, from its predetermined set value.

Thus the described device constitutes a governor which maintains constant the pressure in the container 2 irrespective of the consumption requirements for the compressed gas.

FIGURE 2 shows as an embodiment of the invention a speed governor which functions essentially in a manner similar to that of the pressure governor shown in FIGURE 1, but which includes various structural details which have been embodied therein. The governor shown in FIGURE 2 includes a differential piston 72 which is reciprocable within a cylinder 73. The piston 72 is connected by means of its piston rod 74 to a device 25 consisting of a valve or the like, which is the device controlling the output. For that purpose the valve 25 is connected by conduit 26 to the admission side of a motor 27. The motor 27 is connected by means of a belt drive, or the like, with a speed governor 28. The speed governor 28 comprises a rod 29 which is normally located in a central position, and which can move to the right or to the left from that central position, looking in the direction of FIGURE 2, when the speed of the motor 27 is diminished or increased. The rod 29 is engaged by rod 30 which is pressed against the rod 29 by a release spring 31, so that the rod 30 follows movements of the rod 29 in both directions. That end of the rod 30 which is located away from the governor 28, is situated within a sleeve formed within a hollow piston 32. The piston 32 is slidably mounted within a cylinder 33.

A conduit 34 which is provided with a restriction 62, conveys a fluid under pressure which is pumped into the conduit 34 by pump 35, into the right-hand portion of the interior of the cylinder 33, which constitutes a chamber 45 limited on its right-hand side by a wall of the cylinder 33 and on the left-hand side by the piston 32. The piston 32 contains passages 55 and 56 which may provide a connection between the chamber 45 and a conduit 21 communicating with the conduit 56 of the piston 32 through an opening provided in the cylinder 33. The conduit 21 is connected with a container for the fluid which is not shown in the drawing, and which is also used to supply fluid to the pump 35. A recess or conduit 36 constitutes a narrow passage which is controlled by the position of the rod 30; when this passage is completely closed the rod 30 will penetrate into the piston 32. The left-hand space within the cylinder 33 forms a second chamber 37 which is limited to the left by a wall of the cylinder 33 and to the right by a surface of the piston 32. The cylinder 33 is also provided with an extension which encloses a chamber 39. Fluid under pressure is supplied to the chamber 39 by means of a conduit 42 which branches off the conduit 34. A spring 40 is located within the chamber 39 and has an outer end pressing against the valve body 41 of a double valve 57. The double valve 57 comprises an elongated rod which is integral with the valve body 41 cooperating with the valve seat 58 screwed into the cylinder 33 and forming a part thereof. The double valve 57 also includes a valve body 59 cooperating with a valve seat 61 screwed into the piston 32 and forming a part of this piston. The rod of the double valve 57 is provided with grooves 43 so that the valve body 41 controls a passage between the chambers 39 and 37. On the other hand, the valve body 59 controls a channel 44 formed in the piston 32, so that this channel is closed when the piston is moved to the left from a predetermined position, the channel 44 being opened when the piston is moved to the right of this position. The channel 44 leads into the channel 56 which communicates with the conduit 21.

The chamber 37 within the cylinder 33 is connected by means of a conduit 48 to the chamber 46 provided within the cylinder 73 and limited by the front surface of the piston 72. The chamber 47 of the piston 72 which is located to the side of the annular surface of the piston 72 (below the piston 72 in the diagram of FIGURE 2), is connected by means of a conduit 50 to the feed conduit 34 supplied with fluid by the pump 35.

The operation of the device, which is described hereinafter, is substantially similar to that shown in FIGURE 1:

When the motor 27 is driven at the desired predetermined speed, the rod 29 of the governor 28 is located in a predetermined position which also corresponds to a predetermined position of the rod 30. Under these circumstances the rod 30 regulates the available cross-sectional area of the passage of the conduit 36 in such manner that pressure exerted upon the piston 32 by the fluid located in the chamber 45, is equal to the pressure exerted by the fluid contained in the chamber 47 of the cylinder 73 upon the piston 72. This position of balance of the piston 72, of the liquid link and of the piston 32, is adjusted in such manner that at that time the valve bodies 41 and 59 of the double valve 57 engage their seats and thus close the two passages for the fluid, namely the passage between the chamber 39 and the chamber 37, as well as the passage between the chamber 37 and the conduit 21.

If for some reason, for example, as the result of a diminution of the load of the motor 27, the speed of the motor 27 is increased beyond the desired set value, then the rod 29 of the governor 28, and consequently the rod 30 which engages the rod 29, will be moved to the left of their predetermined set positions of balance. This movement of the rod 30 will close the passage 36, so that the fluid supplied to the chamber 45 through the conduit 34 will not be able to escape any more into the conduit 21. Thus fluid pressure in the chamber 45 will increase and will move the piston 32 to the left. This movement of the piston 32 will be transmitted directly to the piston 72 by the liquid column or link constituted by the fluid located between the two pistons in the chamber 37, the conduit 48 and the chamber 46. However, the piston 32 when moving to the left will move along with it the valve body 41 connected to the valve body 59 by the rod of the double valve 57. Thus the valve body 41 will be raised and a connection will be provided by means of the grooves 43 between the chambers 39 and 37 and thus between the conduit 42 and the chamber 37. Since the conduit 42 is connected to the feed conduit 34, fluid supplied by the pump 35 will be now transmitted to the chamber 37, and, consequently, will supply additional fluid to and thus increase the operative length of the fluid link or column between the pistons 32 and 72. The piston 72 will then continue to move downwardly and the speed of the motor will be diminished by the valve 25 connected to the piston 72. Then, due to the diminution of the speed of the motor 27, the rod 29 of the governor 28, as well as the rod 30, will move to the right. Pressure in the chamber 45 of the cylinder 33 will diminish progressively. Finally the piston 32 will return to its position of equilibrium and the valve body 41 will close the passage to the chamber 37 irrespective of the new position of the piston 72.

If on the other hand, the load upon the motor 27 has been increased and its speed is, therefore, diminished, the rod 29 of the governor 28 will move to the right and the rod 30 will move to the right along with the rod 29, due to the pressure of the spring 31. This movement of the rod 30 will increase the operative cross-sectional area of the passage 36, which makes it possible for the fluid supplied to the chamber 45 to flow through the conduit 21 to the fluid container. Consequently, the pressure in the chamber 45 upon the piston 32 will be diminished. Since pressure in the chamber 37 remains the same, the piston 32 will also move to the right. Since the chamber 37 is connected with the chamber 46 of the cylinder 73, pressure in the chamber 47 will cause the piston 72 to move upwardly. While one end of the double valve 57 remains closed by the engagement of the valve body 41 with its valve seat 58, the valve body 59 will be raised now so as to provide communication between the chamber 37, the passages 44 and 56 within the piston 32, the conduit 21 and the container for the fluid. Due to this flow of the fluid, the liquid column or link between the pistons 32 and 72 is shortened and the piston 72 will continue to move upwardly in the cylinder 73 due to the pressure of the fluid in the chamber 47, so that the valve 25 will open to a greater extent. Then the speed of the motor 27 is increased, so that the rod 29 of the governor 28 and the rod 30 in engagement therewith will be moved to the left and the piston 32 will again assume its position of equilibrium. Then the valve body 59 will be seated and the double valve 57 closed irrespective of the new position of the piston 72.

It is apparent that in the embodiment illustrated in FIGURE 2, the connection between the governor 28 and the piston 42 is assured hydraulically in such manner that the amount of pressure exerted directly upon the controlling device 25 through the intermediary of the liquid column or link, is independent of the governor 28. Thus it is possible to use for this apparatus a governor of a construction having an inherently weak effect.

It is apparent that examples shown above have been described solely by way of illustration and not by way of limitation and that they are subject to many variations and modifications within the scope of the present invention. All such variations and modifications are to be included within the scope of the present invention.

What is claimed is:

1. A hydraulic regulating system for maintaining at a selected value a variable quantity, such as gas pressure or motor-speed, independently of causes affecting said quantity, such as variations in gas output or motor load, said system comprising a device actuated by said variable quantity, a second pressure-actuated device engaging the first-mentioned device and movable from a predetermined position which corresponds ot said selected value, a third movable device controlling said variable quantity, means constituting a liquid column located between and operatively engaging said second device and said third device for transmitting movement from said second device to said third device and causing said third device to diminish said variable quantity when the first-mentioned device is actuated by an increase in said variable quantity and vice versa, and means operatively connected with said first and second devices and said liquid-column means for varying the length of said liquid column by varying the amount of liquid therein when said second device is moved from said predetermined position, the last-mentioned means actuating said third device in the same sense in which it was actuated by said first device to prolong the action of said first device.

2. A hydraulic regulating system for maintaining a variable quantity at a selected value, said system comprising a device actuated by said variable quantity and movable in opposite directions from a predetermined position which corresponds to said selected value, a piston, means operatively connecting said piston with said actuated device, a second movable device controlling said variable quantity, another piston, means operatively connecting said other piston with said second device, means constituting a liquid column located between and operatively engaging the two pistons for transmitting movement therebetween, and means operatively connected with the first-mentioned device and the first-mentioned piston and the liquid column means and communicating with openings formed in the first-mentioned piston for varying the length of said liquid column by varying the amount of liquid therein when said first device is moved from said predetermined position, the liquid column means actuating said second device in the same sense in which it was actuated by said first device to prolong the action of said first device.

3. A system in accordance with claim 2, wherein the first-mentioned means include a power-multiplying device.

4. A system in accordance with claim 3, wherein said power-multiplying device consists of a hydraulic system.

5. A hydraulic regulating system, responsive to condition changes, comprising a first cylinder, a differential piston in said cylinder and separating it into two chambers, a regulator member connected to said piston, a fluid sending line, said regulator member being disposed in said fluid sending line, a second cylinder, a movable piston in said second cylinder and separating it into two chambers, a liquid-filled conduit interconnecting a chamber of the first-mentioned cylinder with a chamber of the second-mentioned cylinder for transmitting liquid pressure between one face of the first-mentioned piston and one face of the second-mentioned piston, a source of liquid under pressure, means connecting said source with the other chamber of the first-mentioned cylinder and the other chamber of the second-mentioned cylinder to exert pressure upon the other face of the first-mentioned piston; means responsive to condition changes and effective to move the second-mentioned piston from a neutral position in one or the other of two opposite directions, liquid exhaust means connected with the second-mentioned cylinder, and valve means operable upon displacement of the second-mentioned piston from said neutral position to connect said conduit through the first-mentioned chamber of the second-mentioned cylinder either with said source of liquid or with said liquid exhaust means to thereby cause the first-mentioned piston to over-travel the position to which it would be moved by the sole displacement of the second-mentioned piston from said neutral position thereof.

6. A hydraulic system as claimed in claim 5, in which the first-mentioned piston is a differential piston having its larger face exposed to the liquid pressure from said liquid filled conduit in said first-mentioned chamber of the first-mentioned cylinder and its smaller face exposed to the liquid pressure from said source in said other chamber of the first-mentioned cylinder.

7. A hydraulic system as claimed in claim 5, in which liquid passages are formed in the second-mentioned piston to establish a communication between said one side of the second-mentioned piston and said source as the second-mentioned piston is moved from neutral position in one direction, or to establish a communication between said one side of the second-mentioned piston and the exhaust as the second-mentioned piston moves from neutral position in the other direction, said valve means blocking said passages when the second-mentioned piston is in said neutral position thereof.

8. A hydraulic system as claimed in claim 5, in which said means responsive to condition changes comprise a spring loaded piston having its working face exposed to the fluid pressure in said sending line at a point downstream of said regulator member and a piston rod connected to the second-mentioned piston at the other side thereof, the force of said spring being such as to balance the fluid pressure in said sending line at said point thereof when the second-mentioned piston is in neutral position, and the diameter of said rod being such that the surface area of said other side of the second-mentioned piston is equal to that of the smaller face of the piston in said first cylinder, said source being connected to said second cylinder so as to expose said other side of the second-mentioned piston constantly to liquid pressure from said source.

9. A hydraulic system as claimed in claim 5, in which the surface areas of both sides of the second-mentioned piston are substantially equal and greater than the surface area of the larger face of said differential piston in the first mentioned cylinder, and in which the second-mentioned piston has passages communicating with the third-mentioned means and controlled by the second-mentioned means, whereby pressure liquid from said source is conducted to the other chamber of the second-mentioned cylinder and discharged therefrom in such manner that liquid pressure is built up at said other chamber when the second-mentioned piston is in neutral position to thus balance the liquid pressure acting on the smaller face of said differential piston.

10. A hydraulic system as claimed in claim 9, in which the first-mentioned means include a restriction adjacent the second-mentioned cylinder, whereby the liquid pressure built up at said other chamber of the second-mentioned cylinder upon a decrease of the normal discharge rate of flow is capable to balance any liquid pressure acting in said one chamber of the second-mentioned cylinder as the second-mentioned piston is moved from neutral position under the effect of the built up liquid pressure.

11. A hydraulic regulating system in accordance with claim 5, wherein the second-mentioned piston is a differential piston, and wherein the means responsive to condition changes are operatively connected with the second-mentioned piston, said liquid-filled conduit constituting a liquid column located between and operatively engaging two front surfaces of the two pistons for transmitting movement between the two pistons.

12. A hydraulic regulating system in accordance with claim 5, wherein the second-mentioned piston is a differential piston, and wherein the means responsive to condition changes are operatively connected with the second-mentioned piston and include resilient means maintaining them at a predetermined position which corresponds to a selected value of gas pressure, said regulator member consisting of a gas-flow controlling damper.

13. A hydraulic speed regulating system comprising a rod movable in opposite directions from a predetermined position which corresponds to a selected speed value, another rod engaging the first-mentioned rod and movable therewith, a piston, a cylinder enclosing said piston, said piston separating the interior of said cylinder into two chambers, another piston, another cylinder enclosing the second-mentioned piston, the second-mentioned piston separating the interior of the second-mentioned cylinder into two chambers, a motor-speed controlling device operatively connected with the second-mentioned piston, a conduit connecting one of the chambers of the first-mentioned cylinder with one of the chambers of the second-mentioned cylinder and adapted to be filled with a liquid constituting a liquid column located between and operatively engaging said two pistons for transmitting movement therebetween, means supplying said liquid under pressure to the other chamber of the first-mentioned cylinder and to the other chamber of the second-mentioned cylinder, the first-mentioned cylinder having an outflow passage communicating with said other chamber of the first-mentioned cylinder and closed by the second-mentioned rod when the second-mentioned rod is moved in one direction from said predetermined position, means forming a third cylinder communicating with the first-mentioned means to receive said liquid therefrom, and valve controlled means between the first-mentioned cylinder and the third-mentioned cylinder and actuated by the first-mentioned piston to provide communication between said third cylinder and said one chamber of the first-mentioned cylinder when the first-mentioned piston is moved in said direction.

References Cited in the file of this patent

UNITED STATES PATENTS

| | | |
|---|---|---|
| 2,179,450 | Gorrie | Nov. 7, 1939 |
| 2,251,729 | Ziebolz | Aug. 5, 1941 |
| 2,304,782 | Donaldson | Dec. 15, 1942 |
| 2,312,464 | Bach | Mar. 2, 1943 |
| 2,313,002 | Mennesson | Mar. 2, 1943 |
| 2,500,618 | Pugh | Mar. 14, 1950 |
| 2,637,301 | Burdick | May 5, 1953 |
| 2,669,229 | Bimberg | Feb. 16, 1954 |
| 2,731,022 | Fischer | Jan. 17, 1956 |

FOREIGN PATENTS

| | | |
|---|---|---|
| 559,665 | Great Britain | Feb. 29, 1944 |

OTHER REFERENCES

"Power," December 1945, p. 88 relied on. (Copy in Div. 28.)